Figure 1:
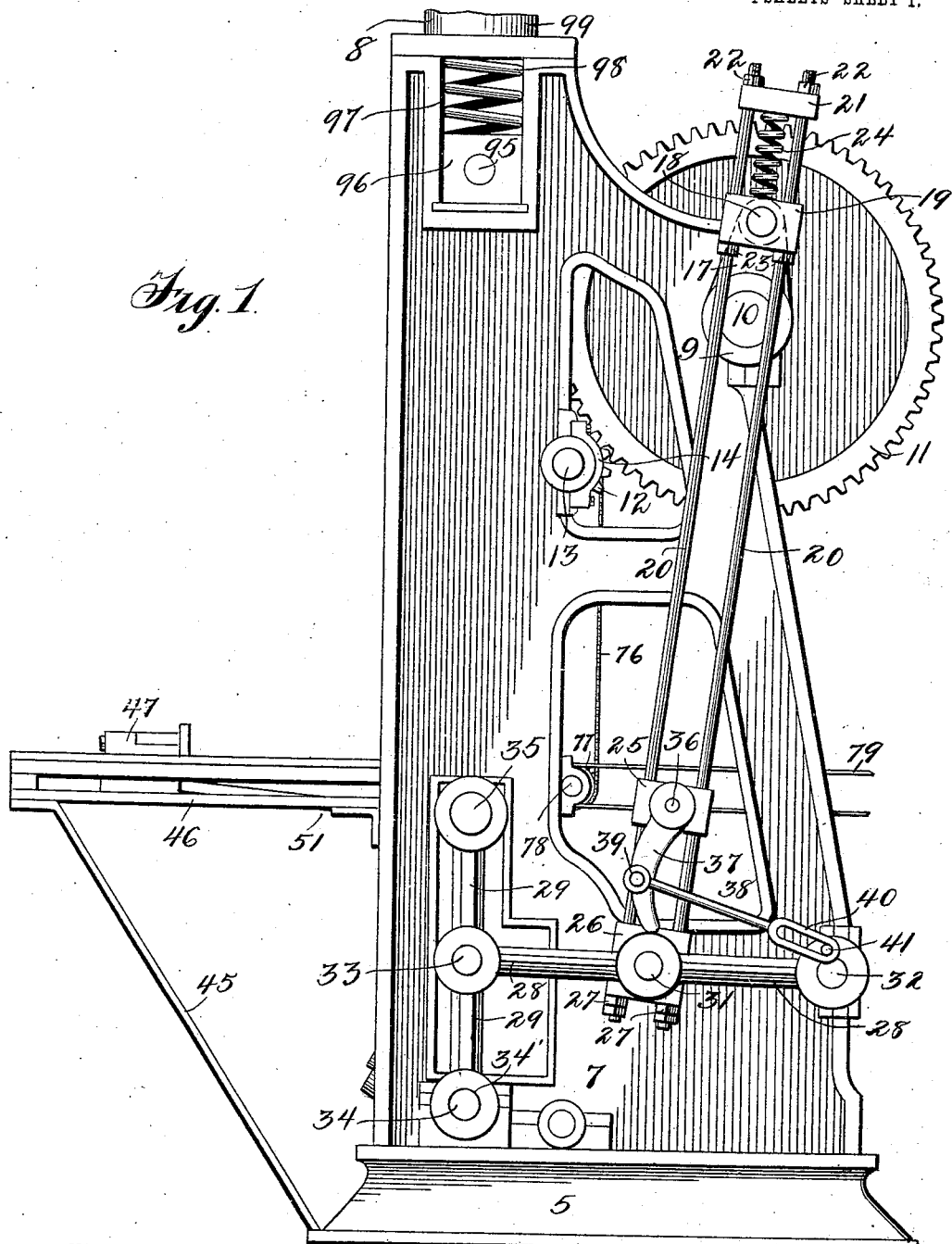

No. 849,258. PATENTED APR. 2, 1907.
E. MURRAY & A. O. TRAVIS.
MACHINE FOR RE-PRESSING BRICK.
APPLICATION FILED FEB. 17, 1906.

4 SHEETS—SHEET 1.

WITNESSES
Frank G. Campbell.
B. S. Gardner.

INVENTORS
Eugene Murray
and Asher O. Travis,
by Shepherd & Parker,
Attorneys.

No. 849,258. PATENTED APR. 2, 1907.
E. MURRAY & A. O. TRAVIS.
MACHINE FOR RE-PRESSING BRICK.
APPLICATION FILED FEB. 17, 1906.
4 SHEETS—SHEET 4.
Fig. 4.
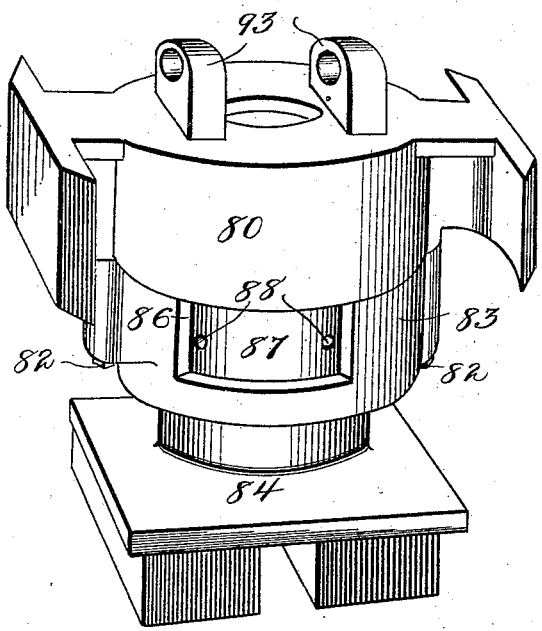
Fig. 5.
Fig. 6.
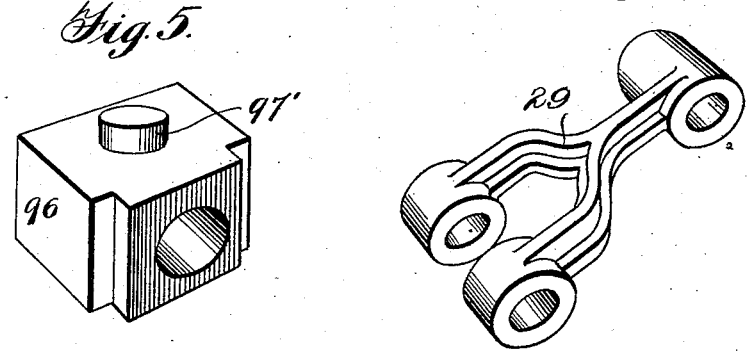
Witnesses
Frank G. Campbell
B. G. Gardner
Inventors
Eugene Murray
and Asher O. Travis
by Shepherd & Parker
Attorneys

UNITED STATES PATENT OFFICE.

EUGENE MURRAY, OF WASHINGTON, DISTRICT OF COLUMBIA, AND ASHER O. TRAVIS, OF DEL RAY, VIRGINIA, ASSIGNORS TO EDWIN L. COCKRELL, OF WASHINGTON, DISTRICT OF COLUMBIA.

MACHINE FOR RE-PRESSING BRICK.

No. 849,258.   Specification of Letters Patent.   Patented April 2, 1907.

Application filed February 17, 1906. Serial No. 301,715.

To all whom it may concern:

Be it known that we, EUGENE MURRAY and ASHER O. TRAVIS, citizens of the United States, residing at Washington, District of Columbia, and Del Ray, Virginia, have invented certain new and useful Improvements in Machines for Re-Pressing Bricks, of which the following is a specification.

Our invention relates to a machine for re-pressing brick.

The object of the invention is the provision of a machine of this character in which the movement of the parts is so arranged that the bricks will be fed into the mold-box with a steady shove instead of being impelled forcibly to the mold-box, as has heretofore been customary.

A further object of the invention is the provision of a brick-making machine in which the bricks to be re-pressed are compressed between vertically-moving plungers, the upper of said plungers being adapted to give in a vertical line if the pressure applied to the bricks exceeds a predetermined amount.

A further object of the invention is the provision of improved means for actuating the upper and lower plungers between which the bricks are to be re-pressed.

A further object of the invention is the provision of a re-press-brick machine constructed to compress roughly-molded bricks between upper and lower plungers and means for continuing the motion of the feed-slide, hereinafter described, after the movement of the lower plunger has ceased, though said feed-slide is actuated from the same shaft that imparts movement to the lower plunger.

A further object of the invention is the provision of a brick-re-pressing machine having vertically-movable upper and lower plungers between which the bricks are compressed, the movement of said plungers being so timed that movement of each of said plungers continues after coming into contact with the rough brick, whereby the compressing action of said plungers is a positive one in contradistinction to the forms of brick-pressing machines in which one of the plungers is moved into position and acts as a fixed abutment against which the opposed plunger presses the brick. By virtue of this construction equal pressure is applied to both the top and bottom of the brick while said plungers continue to move.

Further objects and advantages of the invention will be set forth in the detailed description, which now follows.

Figure 2:
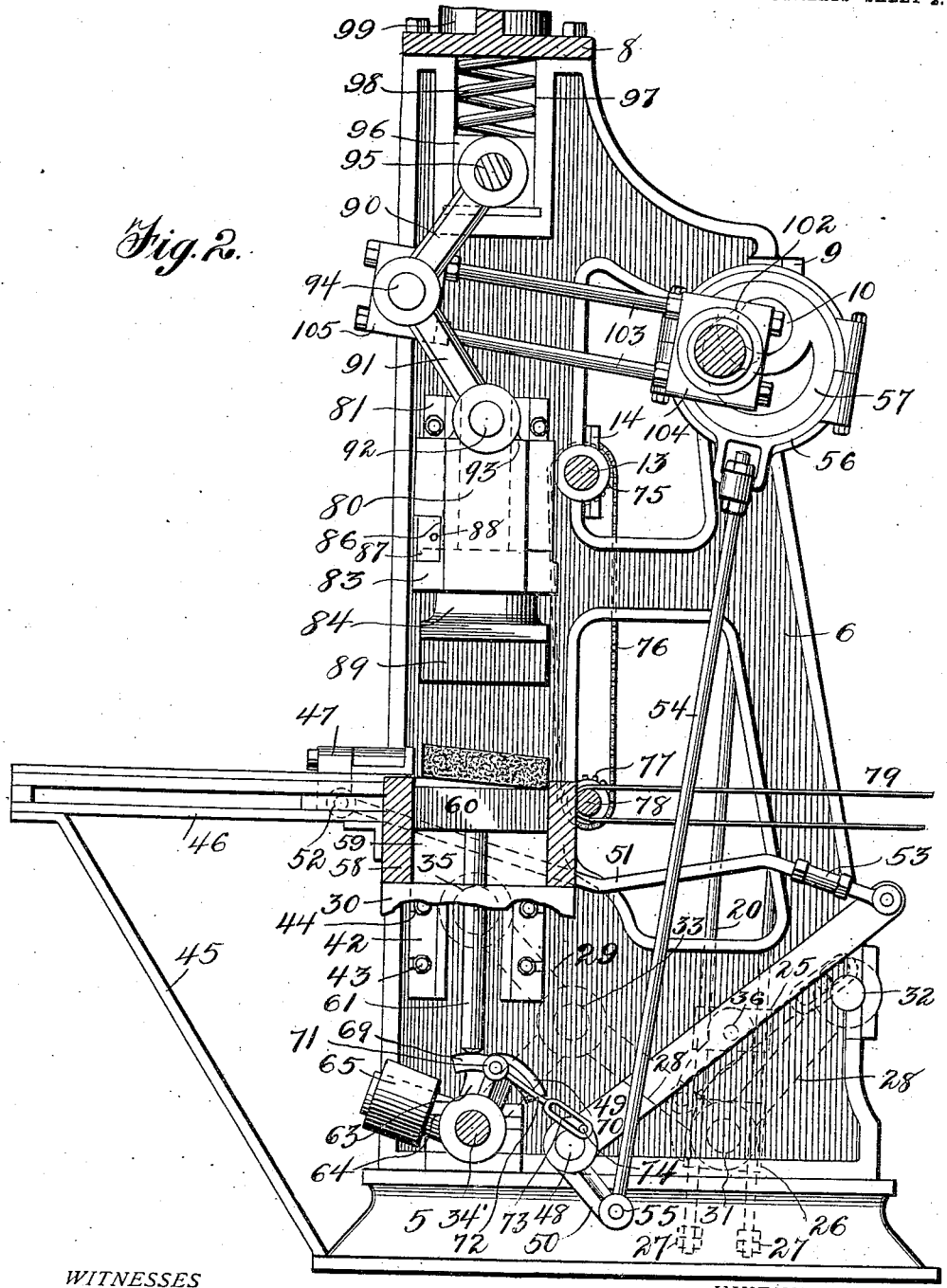
Figure 3:
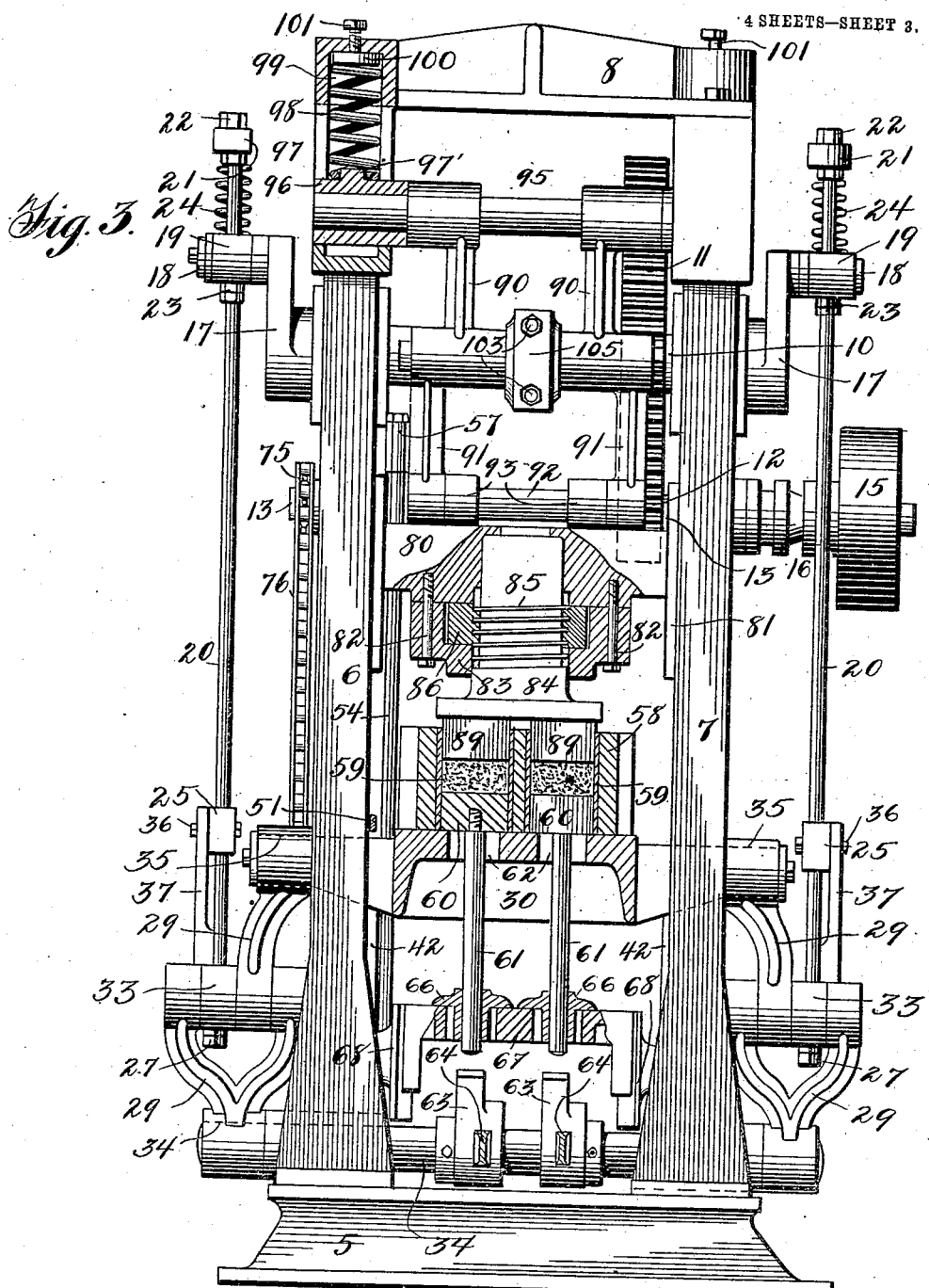

In the accompanying drawings, Figure 1 is a side elevation of a re-press-brick machine constructed in accordance with the invention, showing the parts in the position in which they lie at the end of the compression of the bricks in the mold-box and at the moment when the feed-slide is about to begin its movement toward the mold-box. Fig. 2 is a vertical section of the machine, showing the parts in the position in which they lie when the feed-slide has reached its limit of movement toward the mold-box. Fig. 3 is a front elevation of a re-press-brick machine with certain of the parts in section. Fig. 4 is a detail perspective view of the upper plunger. Fig. 5 is a detail perspective view of one of the upper bearing-blocks hereinafter described, and Fig. 6 is a detail perspective view of one of the lower toggle members.

Like numerals of reference designate corresponding parts in all of the figures of the drawings.

Referring to the drawings, the numeral 5 designates the base of the machine. Mounted upon this base are the side members of the frame 6 and 7. These members 6 and 7 are tied together at the top by a cap 8. Mounted in bearings 9, carried by the side members of the frame, is a shaft 10. Secured upon this shaft is a large gear-wheel 11, which meshes with a pinion 12, fast upon main drive-shaft 13, mounted in bearings 14. Loosely mounted upon this shaft is a pulley 15, through which power is applied to said shaft. This pulley forms one of the members of a friction-clutch 16. This clutch forms no part of the present invention, but is illustrated to show a friction-clutch at this point, though it is to be understood that any form of friction-clutch may be used.

Secured upon each end of shaft 10 and upon the exterior of the side members 6 and 7 of the frame are crank-arms 17, the wrist-pins 18 of which pass through boxes 19, slidably disposed upon connecting-rods 20. The upper ends of these connecting-rods pass through blocks 21 and have nuts 22 threaded thereon. Nuts 23 are threaded upon the rods 20 immediately below the blocks 19 and bear against the under faces of said blocks. Spiral springs 24 bear between the blocks 19 and 21, as is clearly illustrated in Fig. 1.

Secured to the rods 20, near their lower ends, are blocks 25. The lower ends of the rods 20 pass through bearing-blocks 26, nuts 27 being threaded upon the lower ends of said rods and bearing against the under face of blocks 26 when the parts are in the position illustrated in Fig. 1.

Horizontally-disposed toggle-arms 28 and vertically-disposed toggle-arms 29 provide means for imparting reciprocatory movement to a lower cross-head 30. A pivot-pin 31 pivotally connects the horizontal toggle-arms 28 to each other, said toggle-arms being pivoted at 32 to the frame and at 33 to the vertical toggle-arms. The vertical toggle-arms are pivoted at 34' upon a shaft 34 and at 35 to the lower cross-head 30. The blocks 26 encircle the pivot-pins 31, and the rods 20 are slidably disposed in said blocks.

Pivoted at 36 upon the blocks 25 are fingers 37, the lower ends of which rest upon the enlarged hubs of toggle-arms 28 when the parts are in the position illustrated in Fig. 1. Links 38 are pivoted at 39 to the fingers 37, the opposite ends of said links being slotted, as at 40, and engaging pins 41, carried by the enlarged portions of the horizontal toggle members 28.

The cross-head 30 is mounted for reciprocatory motion in guideways 42, which are secured to the side members of the frame by bolts 43, said bolts engaging slots 44, formed in the cross-head slides. Supported by the frame of the machine and by a bracket-arm 45 is a feed-table 46, upon which is slidably disposed a feeding-pusher 47. Pivoted at 48 to the frame of the machine is a bell-crank lever comprising a long arm 49 and a short arm 50. To the outer end of the long arm 49 is pivoted a link 51, the opposite end of which is pivoted at 52 to the feeding-pusher 47. A turnbuckle 53 provides means for adjusting the length of the link 51, and consequently for adjusting the throw of the feeding-pusher 47.

A connecting-rod 54 is pivoted at 55 to the short arm 50 of the bell-crank lever, the opposite end of said connecting-rod being secured to an eccentric-strap 56 of an eccentric 57, which is secured upon shaft 10. Secured upon the lower cross-head 30 is a mold-box 58, having two mold-cavities 59. The bottoms of these mold-cavities are formed by ejecting-plungers 60. Stems 61 are carried by these plungers and project through openings 62 of the cross-head.

Secured to the shaft 34 are cam members 63, from which extend arms 64, carrying weights 65. Secured to the lower ends of the stems 61 by thimbles 66 is a cross-head 67, slidably mounted upon ways 68, carried by the frame. The cross-head and associated parts are clearly shown in Fig. 3 of the drawings, but are omitted from Fig. 2 for clearness of illustration. The cam members 63 comprise a low portion 69 and a high portion 70. Secured at 71 to the cam members 63 is a link 72, the opposite end of which is slotted, as at 73, and engages a pin 74, carried upon the hub of the bell-crank lever formed by arms 49 and 50.

A sprocket-wheel 75 is secured upon the end of shaft 13 opposite the friction-clutch 16. A sprocket-chain 76, which passes over the sprocket-wheel 75 and over a second sprocket-wheel 77, imparts movement to a roller 78, over which passes an endless belt 79, said endless belt providing means for conveying the re-pressed bricks from the machine.

An upper cross-head 80 is slidably disposed in ways 81. Bolted to the under face of the cross-head 80 by bolts 82 is a recessed cap 83. A plunger-head 84 is slidably disposed in the upper cross-head 80 and has threads 85 formed thereon. A nut 86, held between the cross-head 80 and the cap 83, engages the threads 85. The front portion of the cap 83 is cut away, as at 87, leaving the front face of the nut 86 exposed. Openings 88, formed in the face of the nut, provide means for turning said nut when a rod or bar is inserted therein to thereby adjust the plunger-head 84 vertically while the machine is in motion. Plungers 89, carried by the plunger-head 84, are adapted to enter the mold-recesses 59 to compress the bricks therein. Motion is imparted to the upper cross-head, and consequently to the upper plunger, by toggle-arms 90 and 91. The lower ends of the toggle-arms 91 are pivoted to a shaft 92, which passes through said toggle-arms and through ears 93, carried by the upper cross-head 80. The upper ends of the toggle-arms 91 are pivoted to a short shaft 94. The lower ends of the toggle-arms 90 are pivoted to the shaft 94, and the upper ends thereof are secured to a shaft 95, which has its bearing in blocks 96, slidably disposed in ways 97 of the frame. The upper faces of these blocks 96 are provided with studs or bosses 97', said bosses being engaged by the lower ends of spiral springs 98, the upper ends of which enter chambers 99, formed in the cap 8, and bear against plates or washers 100. Bolts 101 provide means for adjusting these washers vertically to thereby vary the tension of springs 98, as will be readily understood.

A crank 102, carried by the shaft 10, serves to impart movement to connecting-rods 103, said connecting-rods passing through a bearing-block 104, which encircles the working portions of the crank, and also passing through a bearing-block 105, which engages shaft 94.

The operation of the device is as follows: When the parts are in the position illustrated in Fig. 1, two roughly-molded bricks are placed in front of the feeding-pusher 47. When clutch 16 is moved to clutch the pulley 15 to shaft 13, motion will be imparted, through said shaft and the pinion 12, to the gear-wheel 11 and shaft 10. This movement of shaft 10 imparts movement to the eccentric 57, connecting-rod 54, the bell-crank lever formed by arms 49 and 50, the link 51, and the feeding-pusher 47, and slides said feeding-pusher toward the mold-box, said feeding-pusher pushing the unpressed bricks ahead of it. At the same time the crank-arms 17 impart downward movement to the connecting-rods 20 by virtue of the fact that the bearing-blocks 19 bear upon the nuts 23. At this time the fingers 37 are held in alinement with the enlarged portions of the toggle-arms 28 and force said toggle-arms downwardly to the dotted-line position illustrated in Fig. 2.

When the lower toggle-arms reach the position illustrated in dotted lines in Fig. 2, the bell-crank lever is in such position that the high parts 70 of the cams 63 are beneath the lower ends of the stems 61 of the plungers 60. At this time the fingers 37 are forced toward the front of the machine by the pin 41 to move said fingers out of engagement with the toggle-levers 28. The lower cross-head will therefore remain in the position shown in Fig. 2.

When the lower ends of the stems 61 rest upon the high part of the cams, the upper surfaces of the ejecting-plungers 60 are slightly above the top of the mold-box. The fingers 37, being no longer in engagement with the lower toggle-arms 28, permit the connecting-rods 20 to move downwardly some distance farther, as shown in dotted lines in Fig. 2, while the lower cross-head remains stationary. During this downward movement of the connecting-rods 20 the movement of the eccentric 57 throws the feeding-pusher to the position illustrated in Fig. 2, the incoming bricks forcing the repressed bricks from the plungers 60 onto the endless belt or carrier 79. When the incoming bricks are about half over the mold-box, the pins 74 and link 72 act to pull the cam members 63 into such position as to move the high portions of the cams from under the stems of the ejecting-plungers, whereupon said ejecting-plungers drop to the position shown in Fig. 2. The rear walls of the mold-cavities then form stops to limit the inward movement of the bricks. During the downward movement of the lower cross-head the upper cross-head and the plungers carried thereby move upwardly, as will be readily understood. As the rotation of shaft 10 continues the upward movement of rods 20 does not at first affect the lower cross-head, and during this initial movement of the rods 20 the eccentric acts to throw the feeding-pusher outwardly. Further upward movement of rods 20 tends to straighten the toggles 28 and 29 to raise the lower cross-head and mold-box. At the same time the movement of the crank 102 and connecting-rods 103 straightens toggles 94 and causes the upper plungers to descend to compress the bricks in the mold-box. The movement of these plungers is so timed that the upper and lower of said plungers continue to move toward each other after they have contacted with the upper and lower surfaces of the rough brick, thereby positively compressing said brick therebetween and applying an equal pressure to each side thereof. If for any reason the pressure imparted to the bricks be greater than the tension of springs 98, said springs give to permit the upper plunger to move slightly upward, as will be readily understood.

By virtue of the construction herein shown and described the lower plunger descends until it is practically flush with the feeding-table. The cams then hold the ejecting-plungers slightly above the top of the mold-box until the incoming bricks push the repressed bricks from the ejecting-plungers. Then the plungers drop to the position shown in Fig. 2. Then the feeding-pusher moves a sufficient distance farther to push the incoming bricks into the mold. The feeding-pusher is then immediately retracted until it is out of the path of the lower plunger, after which upward movement of said lower plunger begins, as has been hereinbefore set forth.

It has been customary in machines of this character to have the feeding-pusher actuated by the same mechanism that actuates the compressing-plungers. Since it is impossible, however, to have the feeding-pusher lie between the plungers as they descend, some machines have been constructed so that the inner limit of movement of the feeding-pusher is slightly beyond the outer edge of the path of movement of the plungers. To get the bricks into the molds, it has therefore been necessary to have the feeding-pusher move at such rate of speed as to throw the bricks into the molds. This results in the rear edges of the bricks being mashed against the rear walls of the mold-cavities, and in some instances it results in the bricks passing beyond the rear walls of the mold-cavities and being cut in two by the plungers. By virtue of the construction herein shown and described the feed imparted to the bricks is a steady and gradual one, said bricks being pushed entirely into the mold by the feeding-pusher.

From the foregoing description it will be seen that simple and efficient means are herein provided for accomplishing the objects of the invention; but while the elements shown and described are well adapted to serve the purpose for which they are intended it is to be understood that the invention is not limited to the precise construction set forth, but includes within its purview such changes as may be made within the scope of the appended claims.

Having thus described our invention, what we claim is—

1. A re-press-brick machine comprising a frame, upper and lower cross-heads reciprocatively mounted in said frame, upper toggle-arms connected to the upper cross-head and to a spring-pressed bearing, a main shaft, means for actuating said upper toggle-arms from said main shaft, lower toggle-arms connected to the lower cross-head and to a fixed portion of the frame, secondary lower toggle-arms connected to the first-named lower toggle-arms and a fixed portion of the frame, and means for actuating said secondary toggle-arms from the main drive-shaft.

2. In a re-press-brick machine the combination with a frame of a main drive-shaft mounted in said frame, a pinion fast upon said drive-shaft, a secondary drive-shaft, a gear-wheel upon said secondary drive-shaft with which said pinion meshes, an upper cross-head, plungers carried by said upper cross-head, toggle-arms connected to said plunger and to a spring-pressed bearing, a crank carried by the secondary drive-shaft, a connecting-rod between said crank and said toggle-arms, a lower cross-head, a mold-box carried by said lower cross-head, ejecting-plungers carried by said lower cross-head and located in the mold-box, a feeding-table, a feeding-pusher, means for imparting a steady reciprocatory movement to said feeding-pusher from the secondary drive-shaft, and means for imparting an intermittent reciprocatory movement to the lower cross-head from said secondary drive-shaft.

3. In a re-press-brick machine, the combination with a frame of upper and lower reciprocatory cross-heads, plungers carried by said upper cross-head, a mold-box carried by said lower cross-head, vertical toggle-arms connected to said lower cross-head and to a portion of the frame, horizontal toggle-arms connected to said vertical toggle-arms and a portion of the frame, a main drive-shaft, a secondary drive-shaft, cranks carried upon said drive-shaft, means for causing the downward movement of said cranks to impart a downward movement to the horizontal toggle-arms during a portion of the downward movement of said cranks and for permitting said horizontal toggle-arms to remain stationary during the remainder of the movement of said cranks.

4. In a re-press-brick machine the combination with a cross-head of vertical toggle-arms connected to said cross-head and to a fixed portion of the frame, horizontal toggle-arms connected to said vertical toggle-arms and a fixed portion of the frame, a rotative shaft, cranks carried by said shaft, bearing-blocks through which the wrist-pins of said cranks pass, connecting-rods passing through said bearing-blocks, fingers carried by said bearing-blocks, and a link which holds said fingers in alinement with a portion of the horizontal toggle-arms during a portion of the stroke of the eccentric-rods.

5. In a re-press-brick machine the combination with a reciprocatory cross-head, of a mold-box carried by said cross-head, vertical toggle-arms connected to said cross-head and a portion of the frame, horizontal toggle-arms connected to said vertical arms and a portion of the frame, bearing-blocks carried by said horizontal toggle-arms, connecting-rods which pass through said bearing-blocks, fingers carried by said connecting-rods, a link for holding said fingers in alinement with said bearing-blocks during a portion of the stroke of said connecting-rods, a rotative shaft, cranks carried by said shaft, bearing-blocks carried by the connecting-rods through which the wrist-pins of said cranks pass, said blocks being carried by the upper ends of the connecting-rods, and springs bearing between said blocks and the bearing-blocks through which the wrist-pins of the cranks pass.

6. A re-press-brick machine comprising a frame, a main shaft journaled therein, an upper cross-head mounted for reciprocatory movement in said frame, operative connections between said upper cross-head and said main shaft, a lower cross-head mounted for reciprocatory movement in said frame, actuating elements carried by said lower cross-head, connections between said shaft and said actuating elements, means for engaging said connections with said elements during a selected part of a revolution of said shaft and means for disengaging said connections from said shaft during the remainder of the revolution.

7. A re-press-brick machine comprising a frame, a main shaft journaled therein, an upper cross-head mounted for reciprocatory movement in said frame, operative connections between said upper cross-head and said shaft whereby the former is driven from the latter, a lower cross-head mounted for reciprocatory movement in said frame, movable actuating elements carried by said lower cross-head, connections between said shaft and said actuating elements, means interposed between said connections and said elements and controlled by the movement of the latter for engaging and disengaging said connections and said elements to effect a downward movement of said cross-head and means carried by said connections for engaging said elements on the upward movement of said connections.

In testimony whereof we affix our signatures in presence of two witnesses.

EUGENE MURRAY.
ASHER O. TRAVIS.

Witnesses:
M. E. VERMILLION,
FRANK G. CAMPBELL.